Jan. 14, 1941.  F. A. PARSONS  2,228,583
INDEXING MECHANISM
Filed Jan. 21, 1937  2 Sheets-Sheet 1

INVENTOR
Fred A. Parsons

Jan. 14, 1941.   F. A. PARSONS   2,228,583
INDEXING MECHANISM
Filed Jan. 21, 1937   2 Sheets-Sheet 2
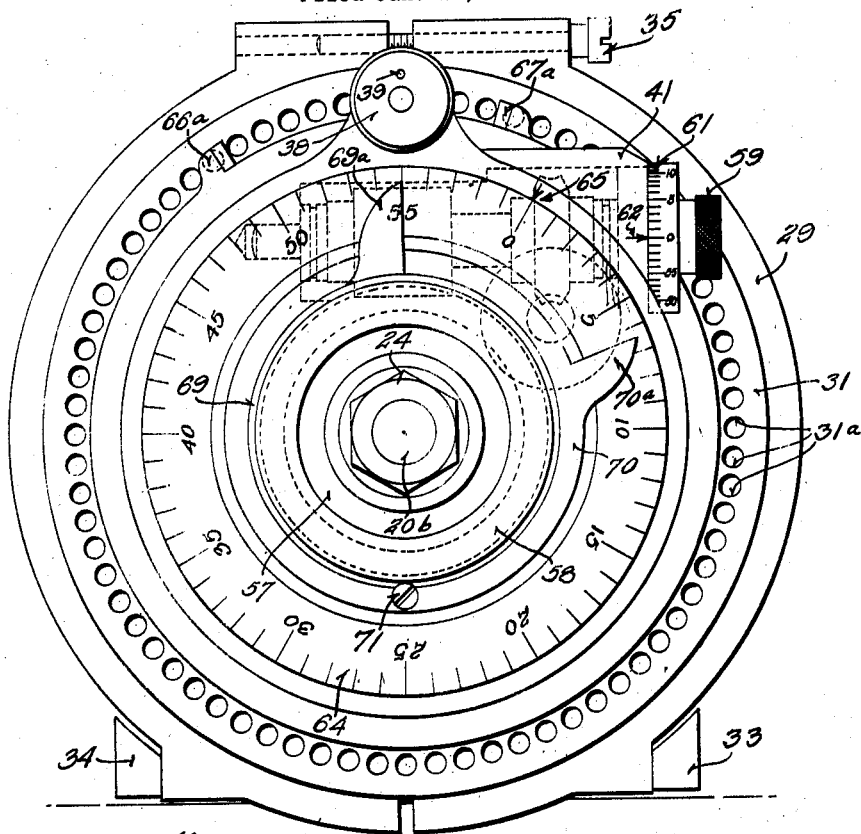
Fig. 2
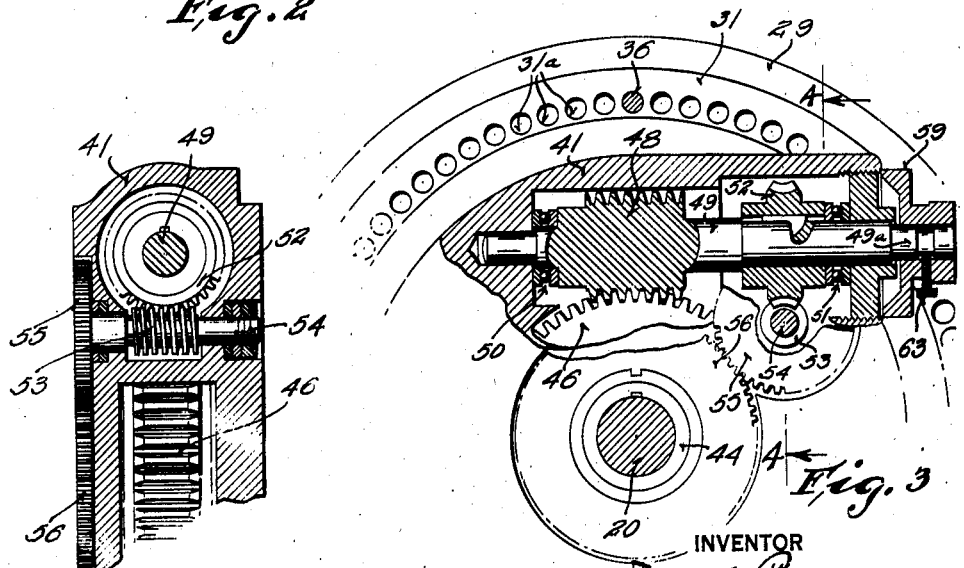
Fig. 4
Fig. 3
INVENTOR
Fred A. Parsons Patented Jan. 14, 1941

2,228,583

UNITED STATES PATENT OFFICE 2,228,583

INDEXING MECHANISM

Fred A. Parsons, Milwaukee, Wis., assignor to Kearney and Trecker Corporation, West Allis, Wis., a corporation Application January 21, 1937, Serial No. 121,599

3 Claims. (Cl. 90—56)

This invention relates to indexing or dividing mechanism, and more particularly to a form of such structure adapted for use in machine tool attachments known as indexing or dividing heads.

An object of the invention is to provide improved indexing means capable of effecting very fine divisions or spacings with a high degree of accuracy between consecutive index movements and without cumulative error in a series of index movements, and particularly in an improved form suitable for angular adjustment or indexing of dividing head spindles.

A further object is to provide indexing means of the type just mentioned in a form for interchangeable or alternative use with less highly organized types of indexing mechanism, as for instance those now in use on dividing heads and similar structures.

A further purpose is to provide an improved indexing device as above, in a form suitable for use in the driving train for rotating a work piece in the operation of the cutting of helical grooves or threads.

Another object is to provide improved indexing mechanism referred to above and of a form and arrangement suitable to be used on dividing heads of the type generally known as universal heads, while permitting of the swiveling and various other adjustments required of such heads and permitting the spindle of the head to be power driven.

A further purpose is to provide improved indexing means useable both for relatively large spacings or division and for relatively very small spacings and of improved and substantially equal accuracy in either instance, and conveniently operable for effecting both relatively fine and relatively large spacings in the same series of spacings.

A further object is generally to simplify and improve the construction and operation of indexing mechanism, particularly for machine tool dividing heads, and still other objects will be apparent from this specification.

The invention consists in the construction, relationship and combination of parts as herein illustrated, described and claimed, and in such modification thereof as may be equivalent to the structure claimed.

The same reference characters have been used for the same parts throughout, and in the drawings:

Figure 2 is a partial front elevation of the same head viewed from the left of Fig. 1.

Figure 3 shows a portion of the mechanism as viewed in Fig. 2, partly in vertical section approximately along the line 3—3 of Fig. 1.

Figure 4 is a partial vertical section approximately along the line 4—4 of Fig. 3.

Figure 5 shows a reduced scale portion of the same dividing head, but with another form of indexing mechanism which is interchangeably or alternatively usable.

Figure 1:
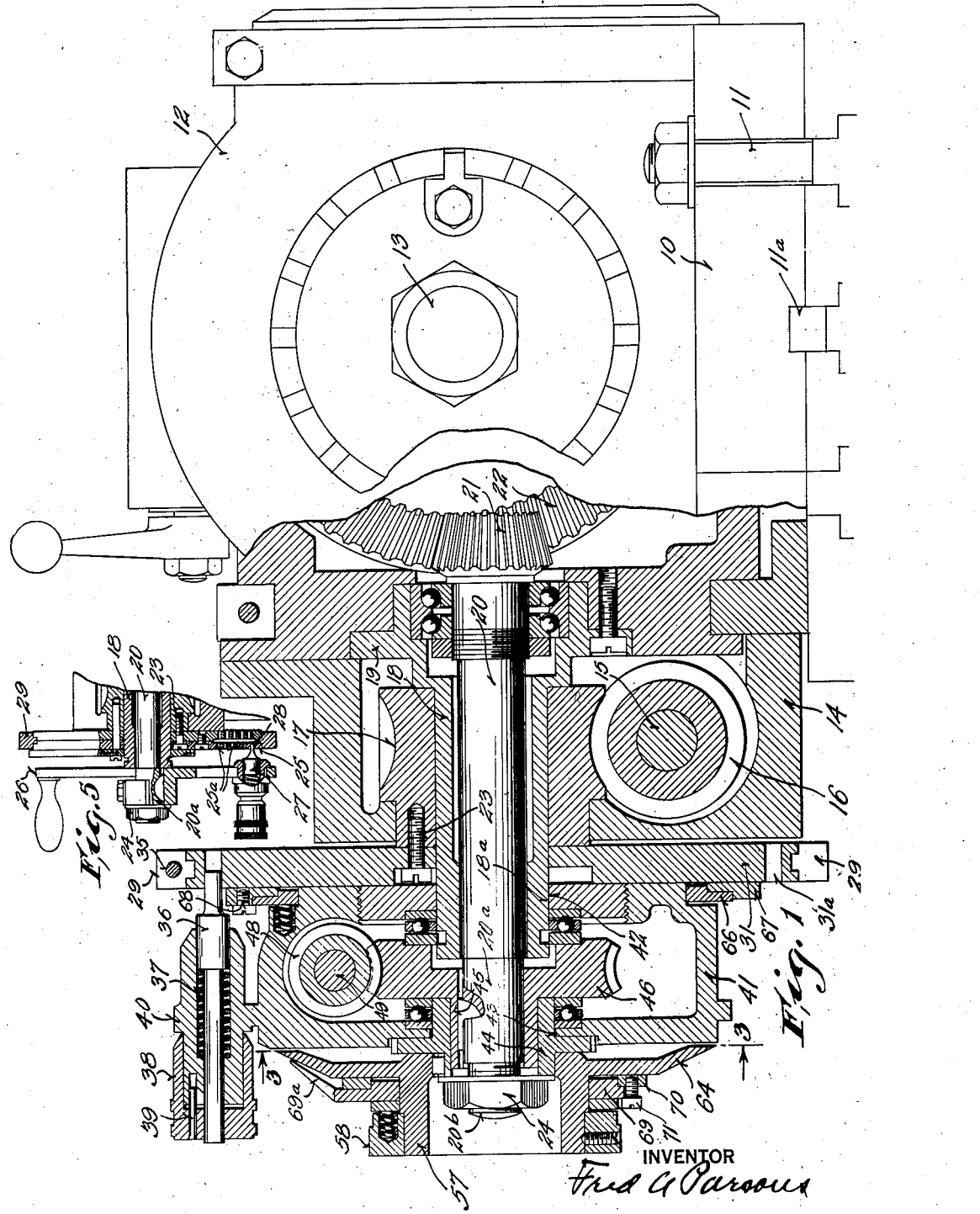
Figure 1 is an end view, partly in section, of a universal dividing head incorporating the invention.

The dividing head as here shown includes a base 10 adapted to be fixed on a milling machine or other machine tool table, as for instance by the means of bolts such as 11 and a tongue or key 11a. The swivel block 12 is rotatably supported by frame 10, and rotatably supports a spindle 13. In the position shown in Fig. 1 the spindle 13 is axially parallel to the lower surface of the base 10 and to the surface of the table upon which the head is supported. The mounting of the swivel block 12 provides for swiveling or rotating the block to effect various angular positions of the spindle 13 relative to the table, between the position shown in Fig. 1 and the vertical. Suitable clamp means, not shown, are provided, both for the swivel block 12 and the spindle 13, to rigidly fix each of these members in any position of their rotatable or angular adjustment.

Fixed to the base 10 is a bracket 14, in which is rotatably mounted a power shaft 15, having suitable coupling means, not shown, for connecting the shaft for power actuation. Carried on shaft 15 is a worm 16, engaging a worm wheel 17 rotatably mounted on a sleeve 18 having an end portion 19 fixed with the swivel block 12 to support the worm wheel 17 co-axially with the axis of swivel adjustment of the block. Also co-axial with the block axis, and journaled in the sleeve 18, is an index shaft 20 having fixed thereon a bevel pinion 21 permanently meshed with a bevel gear 22 which is fixed on spindle 13.

The bushing 18 and shaft 20 respectively provide portions 18a and 20a extended to the left in Fig. 1 for supporting and locating indexing mechanism for spaced angular adjustment of spindle 13, the worm wheel 17 providing screws such as 23 for attaching an index plate thereto, and the shaft 20 providing a threaded end 20b and a nut 24 for retaining portions of the indexing mechanism.

The structure thus far described is fully described in the co-pending application resulting in Patent No. 2,205,361, issued June 18, 1940, and therefore will not be further described. As there shown the indexing mechanism includes an index plate 25, Fig. 5, fixed with the worm 17 by screws 23 and providing a number of index circles of various diameter and respectively providing a different number of equally spaced index holes such as 25a. Fixed on the end 20a of shaft 20 is an index crank 26 carrying a spring pressed index plunger 27 having an end 28 adapted to be alternatively engaged in various of the holes 25a, the plunger being carried in a slotted portion of the crank 26, for adjustment to permit of the co-operation of the plunger with the various index circles of different diameter. The index plate 25 may be rigidly fixed with the base 10 by the means of a clamp ring 29, anchored with the base, the clamp ring 29 being provided with clamp means, later described. The ring 29 may be released to permit the index plate to rotate when power is to be applied to drive the worm wheel 17.

In the present structure a portion of the indexing mechanism just described is replaced by other indexing mechanism, as follows: An index plate 31, Fig. 1 replaces plate 25 and is similarly fixed to the worm wheel 17 by screws 23, and may be fixed or released relative to base 10 by the means of the clamp ring 29 engaging the periphery of the plate, whereby to be rotatable with the worm wheel 17 when power is applied to shaft 15, or to be fixed against rotation, similarly to the plate of the co-pending application previously mentioned, the clamp ring 29 being prevented from rotation by lugs such as 33, 34, Fig. 2 and clamped or released by a screw such as 35.

Index plate 31 provides index holes arranged in a circle co-axial with the shaft 20, the holes being selectively engageable by an index plunger 36, urged in engaging direction by a spring 37, but manually disengageable by the means of a hand grip member 38. The plunger 36 may be retained in disengaged position by turning the member 38 slightly after disengagement, when a pin 39 will abut the end of member 40 which carries the plunger.

The plunger 36 is mounted for rotation on shaft 20, being carried by a housing member 41 having a bearing at 42 on the sleeve 18 and another bearing at 43 on a bushing 44, the bushing 44 in turn having a bearing on the hub 45 of a worm wheel 46, which is keyed with the projecting end 20a of shaft 20.

The housing 41 is normally prevented from rotation relative to the shaft 20 by the engagement of a worm 48 with the teeth of the worm wheel 46, the worm 48 being fixed on a shaft 49 which is rotatably mounted in the housing 41, as shown in Fig. 3, but is prevented from axial movement by thrust bearings such as 50, 51. The threads of the worm 48 are closely fitted to the teeth of worm gear 46, it being contemplated that the worm and worm wheel may be relatively adjustable to insure the close fit of the teeth, as for instance by constructing the worm in the manner shown and described in the Patent No. 2,002,644, issued May 28, 1935. By reason of the construction shown the housing 41, worm shaft 49, worm 48 and worm wheel 46 together provide a crank whereby the movement of the plunger 36 from one to another of the index holes 31a indexes the shaft 20 in accordance with the angular movement of the index plunger.

Supplemental index means are provided, operative through the worm 48 as follows: Fixed on the shaft 49 is a worm wheel 52, engaged by a worm 53 fixed on a shaft 54 journaled in the housing member 41, but prevented from axial movement. Shaft 54 carries a gear 55 engaged by a gear 56 fixed on the sleeve 44 and co-axial with the shaft 20. Fixed for rotation with the gear 56 is an exposed member 57 provided with a hand grip portion 58. The worm wheel 52 and worm 53, similarly to the other worm and wheel, may be relatively adjustable in the manner shown in the Patent 2,002,644, or in other suitable manner. By reason of this construction described the shaft 20 may be indexed independently of movement of plunger 36 through the train consisting of the member 57, gear 56, gear 55, shaft 54, worm 53, worm wheel 52, shaft 49, worm 48, and worm wheel 46.

By reason of the structure described, the shaft 20 may be indexed by disengaging the plunger 36 from the index holes 31a, and rotating the plunger, or the shaft 20 may be indexed by rotation of the manual member 58 through the train previously described, and in either event the one index movement supplements the other, either adding or subtracting the index movements according to the relative direction of movement of the primary manually operated members. The thread angle of the worm 48 is such that the worm is self-locking, and has no tendency to turn its shaft or the parts connected therewith when indexing is effected from plunger 36. The plunger locks the other mechanism when the supplemental index mechanism is in use.

In the construction shown in the drawings the gears 21 and 22 connecting the index shaft 20 to the spindle 13 are of a five to one ratio, and the index plate 31 has seventy-two equally spaced holes 31a. Therefore the movement of the plunger 36 from the one hole 31a to an adjacent hole moves the spindle 13 through an angle of one degree.

Also in the construction shown in the drawings the worm 48 is a single thread worm, and worm wheel 46 has seventy-two teeth. Therefore movement of the manual member 58 sufficiently to turn the shaft 49 through one complete revolution results in indexing the spindle 13 through one degree. The projecting end 49a of the shaft 49 carries a dial member 59 having sixty equally spaced graduations as indicated at 61, the graduations being readable against an index member 62 fixed on the housing member 41. The exposed dial and index members 61, 62 provide means for determining rotations or partial rotations of the shaft 49, and each division of the dial 61 represents one minute of angular index movement of the spindle 13. The dial 59 may be clamped in various positions of rotation relative to shaft 49 by the means of a lock screw 63, whereby to move the dial to a zero starting point between consecutive index movements.

The gear train consisting of gears 55, 56 and the worm and wheel 52, 53, as here shown, are of a ratio which move the shaft 49 through one-sixtieth of a revolution for each rotation of the gear 56 and manual member 58. Fixed on the member 57, to rotate with the gear 56 is a dial member 64, readable against an indicator member 65 fixed on the housing 41. Dial 64 has sixty equally spaced graduations as indicated in Fig. 2. A movement of the manual member 58 sufficient to move dial 64 one graduation space relative to the indicator, results in an index movement of the spindle 13 through an angle of one second.

Relatively adjustable sector elements 66, 67 are provided, for indicating successive steps in any series of index movements. The sectors are relatively adjustable to span the required number of index holes 31a and may be clamped together to be rotatable as a unit by a screw 68. The indexing proceeds by first adjusting the one sector lug 66a or 67a against the end of the index plunger, then disengaging the index plunger from the plate, rotating it to engage the hole adjacent the other lug and reinserting the plunger, followed by turning the pair of sectors to again engage the plunger as at first. This method avoids the necessity of counting the required number of index holes each time the index plunger is moved in performing a series of index operations. Similarly for the dial 64 there is provided a pair of rotatable sectors 69, 70, which can be locked together by a screw 71, the sectors having lugs 69a, 70a which may be relatively adjusted to set off any desired space on the dial.

In the indexing of work pieces fixed to rotate with the spindle 13 with the index plate and index trains as above described, the angular spacing between the index positions is first determined in degrees, minutes, seconds and fractional seconds. Since the index plate 31 has only seventy-two holes, if there are more than seventy-two degrees in the required index spacing the plunger 36 will be given one or more complete revolution. If the indexing movement requires a number of degrees which are not an exact multiple of seventy-two degrees, then such extra degrees of movement are obtained by partial revolutions of the plunger 36, and for spacing such partial revolutions the sector lugs 66a and 67a are spaced to include between them as many of the index holes 31a as are required for the required number of degrees.

Where an indexing movement of spindle 13 is not in even degrees, but requires additional minutes, the added movement is obtained by rotation of the manual member 58. This member will be given as many complete revolutions, as determined by the indicator 65, as there are minutes of additional index movement required. In this movement the dial 61 provides a counter or indicator as a check on the number of complete rotations of the dial 64. Following each index movement of the manual member 58, the dial 61 may, if desired, be set back to a zero position by loosening the screw 63.

If an index movement requires seconds of movement, in addition to the minutes and degrees obtained as just described, then in addition to the complete revolutions of the dial 64, the dial is given an additional partial revolution depending on the additional seconds of index movement required. The lugs 69a and 70a of the pair of sectors 69, 70 are spaced to include between them a dial space corresponding to the seconds of additional index movement required, and following each index movement the sectors are reset against the indicator 65 in a position to indicate the next partial revolution of the dial 64.

Fractional seconds may be readily set off between the lugs 69a and 70a on the dial 64, but since the space corresponding to one second of arc is entirely negligible in ordinary instances upon any practical work diameter, the only reason, ordinarily, for considering fractional seconds of arc is to provide such surplus of movement as will prevent an accumulation of errors during a series of index movements.

It is obvious that the device may also be constructed with index circles and trains which permit the index movement to be computed directly in decimals. Thus, for instance, if the index plate 31 is provided with twenty holes, then each movement of the plunger 36 from one hole to another will result in one hundredth of a revolution of the spindle 13. Further if the worm wheel 46 is provided with one hundred teeth, and the gear train from the dial 64 to the shaft 49 provides for one-hundredth revolution of shaft 49 at each revolution of the dial 64, and in addition both the dial 61 and the dial 64 are provided with one hundred graduations, then instead of the degrees, minutes and seconds, the index movement of the spindle 13 may be computed in hundredths of a revolution, obtainable by movement of plunger 36, in ten-thousandths, obtainable by complete revolutions of the dial 64 as indicated on dial 61, and in millionths, obtainable by revolution of the dial 64 from one to another of the graduations, partial millionths of index movement of the spindle 13 being obtained by partial divisions on the dial 64.

It will be understood that in order to avoid a large number of revolutions of the dial 64, it may be desirable in certain instances to index the plunger 36 through a distance somewhat in excess of the index movement required for the spindle 13, then using the dial 64 to turn the spindle 13 in the opposite direction in the amount of such excess, the sector pairs being set accordingly.

The supplemental index mechanism, in the construction shown, avoids spaced index holes principally in order to permit of splitting up the smallest indicated movement to avoid accumulation of errors, as previously mentioned. It is obvious that spaced index holes and a plunger could be used instead of the dial, but such construction would limit the fractional advance of the mechanism to certain fractions, whereas the mechanism shown provides for any increment of advance.

It is to be noted that in the device shown the entire index mechanism, except plate 31, may be removed as a unit upon removing nut 24, the gear 46 being removably fitted on shaft end 20a and the parts carried by sleeve end 18a being also removably fitted. The index plate 31 and clamp ring 29 may then also be removed after removing screws 23. This construction permits the mechanism to be interchangeably replaceable with that shown in Fig. 5, or with other similar mechanism, such as the mechanism, previously mentioned, constructed for indexing spindle 13 in hundredths, thousandths and millionths of a revolution.

It is further to be noted that the connection of the supplemental index mechanism through the self-locking worm and wheel structure and the manner of positioning this structure in the main index train removes all cutting load from the supplemental index mechanism, and also removes all load from the supplemental index mechanism during power rotation of the main spindle. By the construction shown the main index connection can be made relatively rigid and sturdy to adequately resist the cutting and power loads, while the supplemental mechanism for very fine and accurate adjustments, because not subject to any loading except the frictional resistance to index movements, will retain its accuracy indefinitely.

What is claimed is:

1. In an index mechanism the combination of an indexable member, a rotatable index shaft, an index plate providing a series of equally spaced index holes arranged in a circle concentric with the axis of said shaft, a crank member rotatable co-axially with said shaft, an index plunger bodily rotatable with said member for selective engagement with different of said index holes, an index train connecting said crank member for rotation of said shaft, said train comprising supplemental index elements relatively rotatable to alter the position of said index shaft relative to the crank member, manual means for relative rotation of said supplemental index elements independently of the rotation of said crank member, exposed index measuring elements relatively rotatable in accordance with the relative rotation of the supplemental index elements of said train, and other exposed index measuring elements relatively rotatable in accordance with the relative rotation of the supplemental index elements, said other exposed index measuring elements providing means indicating whole revolutions of relative movement thereof and a series of equal increments of partial revolution, the connection of said other index measuring elements being of such ratio that whole revolutions of the relative rotation of the first mentioned index measuring elements moves said other index measuring elements only through one of said increments.

2. In an index head the combination of a base providing means for removable attachment to a machine tool platen, an indexable spindle rotatably carried by said base, an index shaft carried by said base for rotation on an axis transverse to the spindle axis, a connection between said shaft and spindle including gearing, an index plate carried by said base and providing a series of equally spaced index holes in a circle co-axial with said shaft, said spindle and connecting gear being axially spaced at one side of said plate, said plate providing a bore and said shaft providing an end portion projecting through said bore at the other axial side of said plate; and a unitary device removably associated with said projecting shaft end at said other side of said plate including a crank member rotatable co-axial with said shaft, a plunger carried by said crank for bodily rotation therewith to positions for engaging different of said index holes, an index train connecting said crank member and shaft, supplemental index means including a plurality of supplemental index elements one of which is rotatable relative to the other independently of rotation of said crank, an index train connecting said rotatable supplemental index element and said shaft, and means associated with said supplemental index elements for determining the index movement communicated to said shaft upon rotation of said rotatable element, said index trains being of materially different ratio, and means associated with said shaft end for fixing said device removably in operative association in said index head at said other side of said index plate.

3. In a dividing head the combination of a base providing means for removable attachment to a machine tool platen, a block swivelably trunnioned on said base, an indexable spindle journaled in said block for rotation on an axis transverse to the swivel axis of said block, an index shaft co-axial with the swivel axis of said block, a connection between said shaft and spindle including gearing, a gear co-axial with said shaft and providing a hub portion, an index plate fixed on said hub portion and providing a series of equally spaced index holes in a circle co-axial with said shaft, clamp means operable for alternative rotation of said index plate or for fixing the plate in non-rotatable relation to said base, said plate providing a bore and said shaft providing an end portion extending through said bore, a crank member rotatable co-axially with said shaft, a plunger carried by said crank member for rotation therewith to positions for engaging different of said index holes, an index train connecting said crank member for rotation with said shaft; and supplemental index means including relatively rotatable index measuring members one of which is rotatable co-axially with said shaft, and a supplemental index train connecting the rotatable member for rotation of said shaft independently of rotation of said crank member, said index train and supplemental index train being of materially different motion transmitting ratio.

FRED A. PARSONS.